April 5, 1932.  E. S. BRISTOL  1,851,974
CONTROL METHOD AND APPARATUS
Filed March 31, 1930   5 Sheets-Sheet 1

INVENTOR.
Edward S. Bristol
BY Cornelius L. Ehret
ATTORNEY.

April 5, 1932.  E. S. BRISTOL  1,851,974
CONTROL METHOD AND APPARATUS
Filed March 31, 1930  5 Sheets-Sheet 2

INVENTOR.
Edward S. Bristol
Cornelius A. Chret
BY
ATTORNEY.

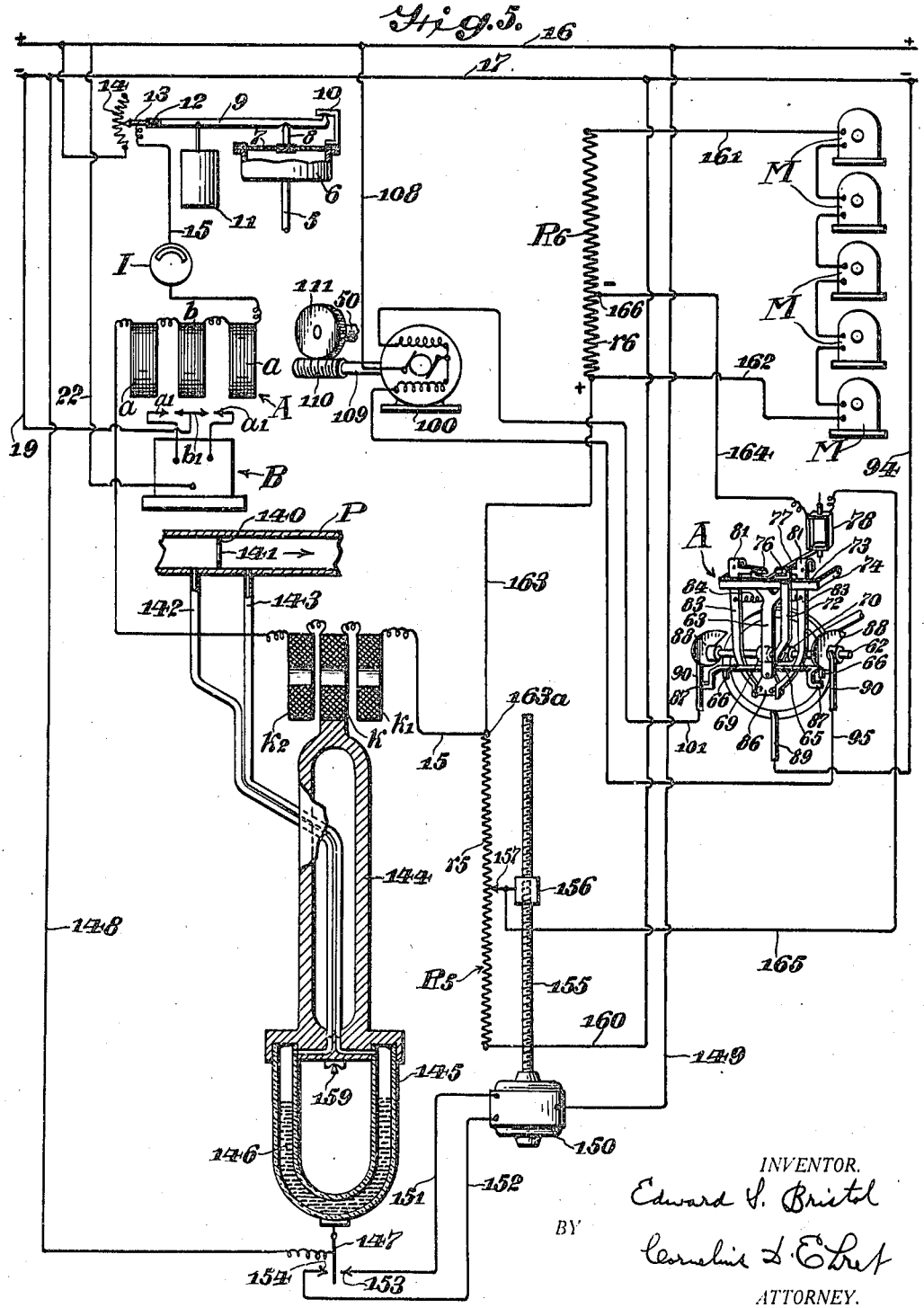

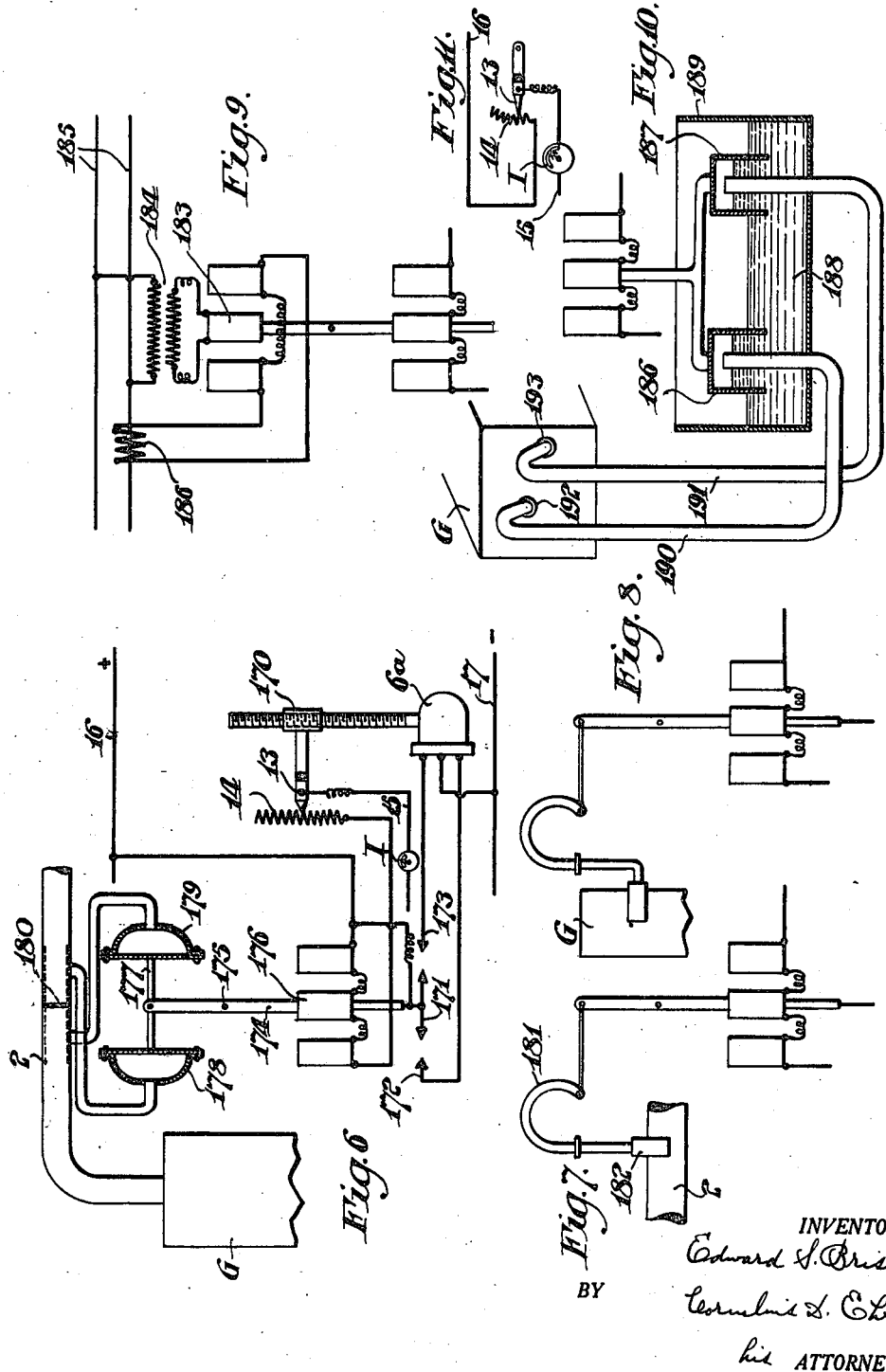

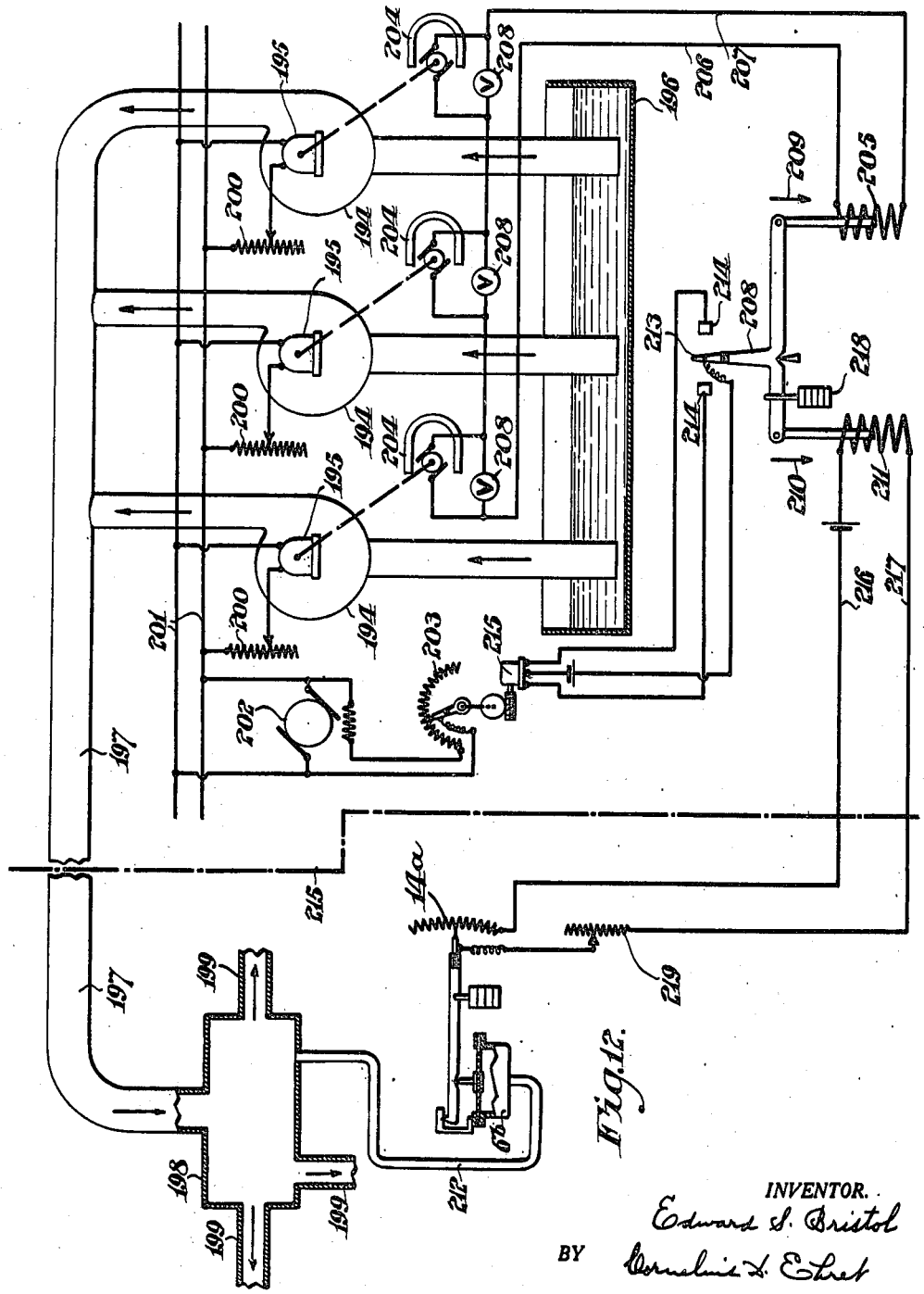

Patented Apr. 5, 1932

1,851,974

UNITED STATES PATENT OFFICE

EDWARD S. BRISTOL, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

CONTROL METHOD AND APPARATUS

Application filed March 31, 1930. Serial No. 440,597.

My invention relates to control methods and systems and more particularly to control of combustion.

In accordance with my invention, in a combustion system supplied with a plurality of streams of fuel, a ratio is established between the average rate at which fuel is supplied and changes in load on the system by maintaining a force proportional to said average rate of fuel supply and another force proportional to the changes in load, and utilizing said forces jointly for establishing the aforesaid ratio.

Also in accordance with my invention and more particularly in a combustion system of aforesaid type, the magnitude of a force, as an electromotive force, is maintained proportional to the average rate of speed of a plurality of variable speed devices, specifically fuel-feeding devices; a second force, preferably also an electromotive force, is varied in accordance with changes of a condition dependent upon operation of the devices; and these forces are utilized jointly to control the average speed of the fuel-feeding devices, or the like.

Further in accordance with my invention, there is developed an electromotive force proportional to the average of the different rates at which fuel is supplied to a furnace by a plurality of independently functioning feeding devices, and the aforesaid electromotive force is balanced against or opposed to another force varying in magnitude to accord with changes in load on the furnace and changing the rate of air delivery, whereby said electromotive force and said other force jointly maintain a predetermined ratio between the aforesaid agents of combustion, and more particularly, said other force is established by a control current having different magnitudes dependent upon the load on said furnace, said control current traversing suitable control apparatus for regulating the rate of air delivery to the furnace.

Further in accordance with my invention, in a steam-generating system or the like involving delivery of fuel thereto at different rates by a plurality of independent fuel-feeding devices, the rate of air delivery and the average rate at which fuel is supplied are maintained at a predetermined ratio by a member movable in response to departure of said ratio from its predetermined value for changing said average rate of fuel supply.

My invention resides in the method, system and apparatus of the character hereinafter described and claimed.

For an illustration of my method and for an illustration of some of the various forms my invention may take, reference is to be had to the accompanying drawings in which:

Fig. 5 is a diagrammatic view of another form of my invention.

Figs. 6 to 11 are diagrammatic views illustrating various modifications.

Fig. 12 is a diagrammatic view of a speed-control system embodying my present improved method and system for controlling variable speed devices and wherein the latter form part of a system other than one for combustion control.

Figure 1:
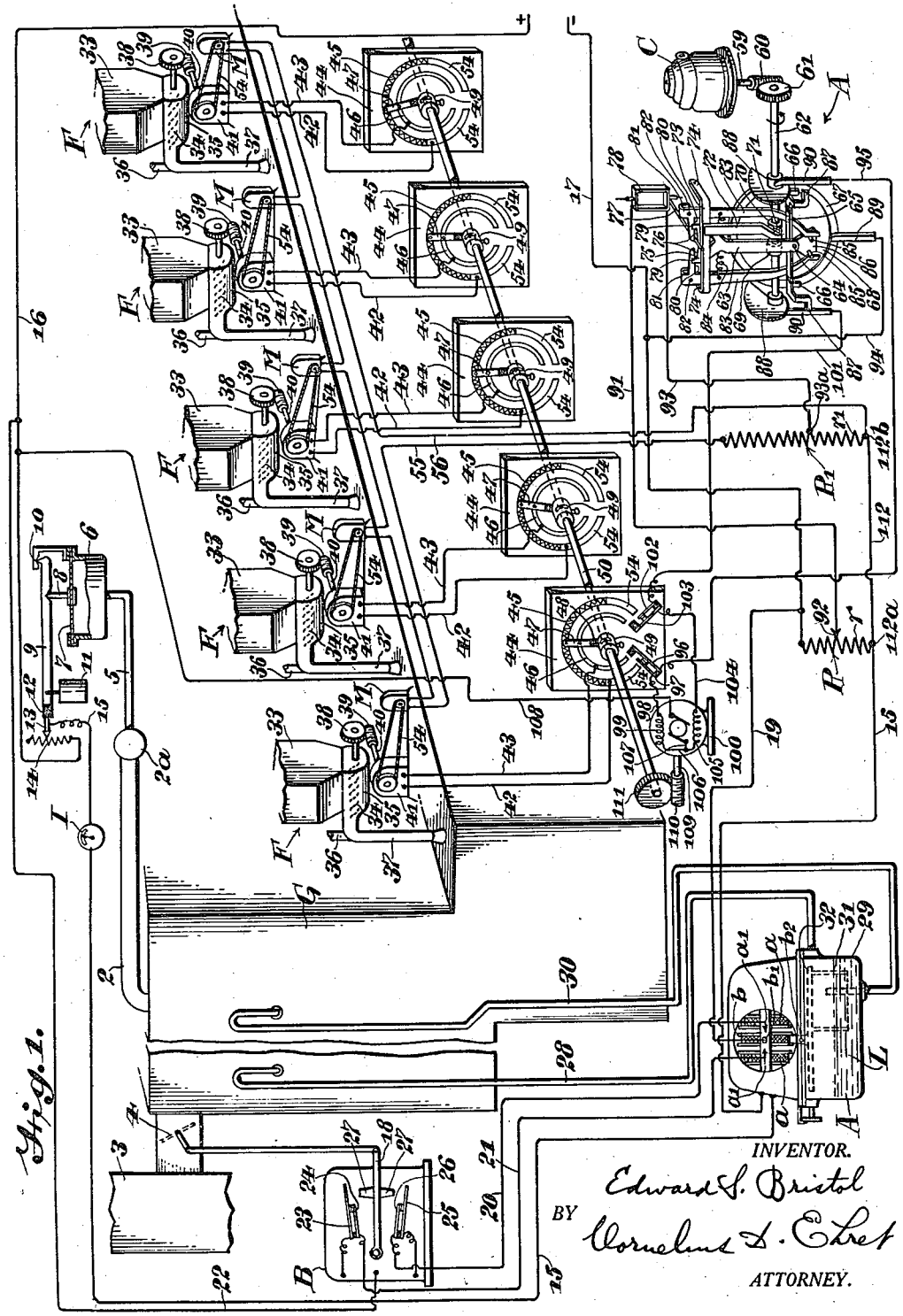
Fig. 1 is a perspective view somewhat diagrammatic and on a distorted scale of a single steam generator whose rate of combustion is controlled in accordance with my invention.

Referring to Fig. 1, there is illustrated a furnace or steam generator G of any desired type comprising, in the example illustrated, suitable water tubes and baffle walls, not shown. The hot gases resulting from combustion of the fuel pass in a circuitous path and engage the usual steam drum, from which steam is discharged through the pipe 2 to the header 2a, the gases being thereafter discharged to the stack or chimney 3 under control of the damper 4.

The pressure of the steam delivered through the pipe 2 and header 2a is communicated through the pipe 5 to the chamber 6, one of whose walls is a flexible diaphragm 7 acting through the post 8 upon the lever 9 fulcrumed upon the knife edge 10. In practice lever 9 is preferably provided with a suitable balance or biasing weight 11.

Secured to but insulated from the lever 9 by the member 12 is the contact arm 13 coacting with the resistance 14 to vary, in response to changes of the steam pressure upon the under side of the diaphragm 7, the magnitude of the control current supplied by a substantially or preferably constant potential source to the control circuit comprising the conductor 15 connected, on the one hand, through the adjustable resistance 14 with the conductor 16 connecting with one terminal of the source of current, and, on the other hand, with the conductor 17 connecting with the other terminal of the source of current. In the example shown, a resistance R and a control balance A, utilizable as hereinafter described, are included in the control circuit 15.

The control balance A may be of any suitable character, for example, of the type disclosed in my prior application Serial No. 234,410, filed November 19, 1927. The control circuit includes in series with each other the control balance coils or windings, herein shown as comprising the fixed coils a and the movable coil b freely tiltable on the knife-edge or pivot b2. When suitable or desirable, the ammeter, recording ammeter or integrating meter I may be included in series in the control circuit.

For controlling the damper 4, there is provided a reversible motor B of any suitable type, herein shown as a two-field series motor wherein rotation in the desired direction may be effected by energizing the proper field winding of said motor, driving, preferably through reduction gearing, not shown, the oscillatory lever 18 connected as shown to the damper. The contact b1 attached to the movable coil b of control balance A is connected by a conductor 19 to conductor 17, the latter, as stated above, being connected to the source of current. The fixed contacts a1 of the control balance are connected, respectively, by conductors 20 and 21 to the series field windings of the motor B, the armature of which is connected by a conductor 22 to conductor 16, the latter leading to the source of current supply. A movable contact 23 and a fixed contact 24 constitute a limit switch in the field circuit controlled by one control balance contact, while similar contacts 25 and 26 constitute a limit switch controlled by the other fixed control balance contact. The lever 18 carries the oppositely extending members 27 adapted to engage the movable contact 23 and 25 at the limits of travel in opposite directions to break the motor circuit.

In the example shown, balance A is controlled by a differential pressure representative of the rate of flow of the gaseous products of combustion through the boiler. To this end, a pipe 28 opening into the boiler near the gas outlet communicates with the space above the level of the liquid L contained in the vessel 29 of balance A, while a second pipe 30 opening into the boiler at a point nearer the furnace chamber communicates with the interior of the bell 31 carried by the pivoted balance arm 32, to which is secured the movable coil b. The differential pressure thus applied to the control balance A is proportioned to the square of the rate of gas flow through the boiler. Coils a and b are so connected as to give a net force proportioned to the square of the current flowing through control circuit 15. As a result, when the moving coil is in balance, the gas flow is directly proportional to the control current.

For a substantially constant load on the apparatus supplied with steam through the pipe 2, the position of damper 4 will be such that the draft will have a value effecting proper combustion rate to satisfy the demand. Under these conditions, the current through the coils a and b will have assumed and will remain at a certain definite value.

Upon increase of load, the pressure of the steam delivered through pipe 2 will fall, and the magnitude of the control current as regulated by contact 13 will automatically increase. In other words, for each steam pressure the control current partakes of a predetermined magnitude, the magnitude of the control current changing inversely proportionately with the change of steam pressure.

Accordingly, as the steam pressure falls with increasing load, the magnitude of the control current increases to a corresponding predetermined value. As a result the force exerted by the control current on the control balance coils a and b throws the movable coil b out of balance, causing energization of the motor B, which rotates in such direction as to move the damper 4 at the stack 3 further toward open position until the increased differential pressure ultimately balances the force exerted by the control coils a and b, at which time the motor B is deenergized with the damper 4 wider open. For a decrease of load causing a rise of steam pressure, the damper 4 is similarly moved to a new position nearer its closed limit.

Figure 4:
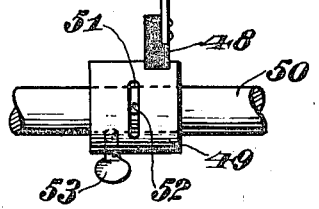
Fig. 4 is an enlarged elevational view showing one form of adjusting mechanism for a contact arm.

The fuel-feeding mechanism comprises, in the example shown, five units F for delivering pulverized fuel to a furnace, the fuel, in each unit, passing under the influence of gravity from the bottom of a hopper 33 into engagement with a screw 34 rotatable in a casing 35 forming the hopper bottom. The fuel is transported by screw 34 from the right toward the left, as viewed is Fig. 1, and at or adjacent the end of said screw contacts with a stream of air passed along a conduit 36 into casing 35 by any suitable mechanism, not shown. The resulting mixture at considerable velocity enters the furnace chamber by way of the feeder piping 37. Carried by the shaft of screw 34 is a worm gear 38 meshing with and driven by a worm 39 secured to the shaft 40 of a motor 41, herein shown as of the direct-current shunt type. For varying the speed of motors 41, their fields are connected, respectively, by conductors 42 and 43 with the field rheostats 44, each comprising, in the example shown, a suitable resistance element 45 connected to conductor 42 and a conductive strip 46 connected to conductor 43. A contact point on the electrically conductive arm 47 coacts with element 45, and another contact thereon coacts with the conductive strip 46, said arm comprising a portion 48 of suitable insulating material carried by the collar 49 mounted on the shaft 50. To the end that arm 47 may be adjusted circumferentially of shaft 50, collar 49 may be provided with a slot 51, into which extends a pin 52 carried by the shaft, said collar being maintained in a desired adjusted position by a set screw 53 or the like, threaded into said collar and coacting with the shaft 50, Fig. 4. Each rheostat 44 may be provided with the contact strips 54 forming continuations of the ends of resistance element 45. In the event of overtraveling movement of arm 47 in one direction or the other, the end thereof rides upon and is supported by one of said strips.

As indicated, shaft 50 is common to all the collars 49 and, accordingly, rotation of said shaft effects simultaneous adjustment of each rheostat.

Forming a part of each unit F is a suitable device, as the commutating magneto M, for generating a uni-directional voltage proportional to the speed of motor 41. To this end, the rotatable element of the magneto is driven at a speed proportional to the motor speed in any suitable manner, as by the endless band or chain 54 encircling pulleys carried, respectively, by the motor and magneto shafts. In Fig. 1, magnetos M are shown as connected in series by the conductors 55 and 56 connected to the terminals of a suitable resistance R1. Accordingly, the resultant total voltage generated by the series-connected magnetos M is applied to the terminals of the resistance R1.

In accordance with my invention, the average of the different rates of fuel feed or average speed of the fuel-feeding devices is related to changes in load and hence to the rate of air flow by balancing the voltage across resistance R1, as determined by the series-connected magnetos M, against the voltage drop across the resistance R, as determined by the passage of the control current therethrough. As described above, control balance A functions continuously to maintain the rate of air flow proportional to the control current.

As one manner of effecting a corrective adjustment of the rate of fuel feed upon change in the rate of air flow, as aforesaid, I may utilize automatic control apparatus of the character disclosed in U. S. patent to Leeds, No. 1,332,182, with which, upon unbalancing of the voltages across resistances R and R1, a galvanometer deflects and the control mechanism closes a circuit to produce a corrective adjustment of the rate of fuel feed.

As herein shown, the automatic control apparatus comprises an electric motor C, suitably supported, which rotates the shaft 59, preferably at substantially constant speed, which in turn drives the worm 60 meshing with and driving the worm gear 61 secured upon the shaft 62 having suitable bearings on a frame, not shown. To the back of a lever 63, pivoted at its upper end to the aforesaid frame, is secured a bracket, not shown, and between the bracket and member 63 and carried by them is a pivot 64 on which the arm 65 is pivotally mounted. On each end of the arm 65 is a metal shoe 66 for electrically contacting with the rim 67 of the wheel 68 secured upon a shaft, not shown. Secured upon the shaft 62 is a cam 69, which periodically engages the lever or member 63 and moves it outwardly in opposition to a spring, not shown, thereby lifting the shoes 66 free from the rim 67 of the wheel 68, the aforesaid spring returning the shoes 66 into engagement with the rim 67 after predetermined rotation of cam 69. Upon the shaft 62 is secured a second cam 70 which immediately after the cam 69 has caused the lifting of shoes 66 from rim 67, engages the end of finger 71, on the lower end of arm 72, which is secured at its upper end to the member 73 whose arms 74 are pivoted to the aforesaid frame, not shown. Upon the frame or member 73 is secured the member 75, whose upper edge 76 is inclined and increases in height from the center outwardly. Disposed immediately above the edge 76 is the needle or pointer 77 of any suitable measuring or indicating instrument, as, for example, a galvanometer having the movable coil 78, which actuates or deflects the attached pointer or needle 77. At opposite ends of the member 76 are the abutments 79 for limiting the deflection or swing of the needle 77. Directly above the needle 77 and beneath which it normally freely swings are the edges 80, preferably straight horizontal edges, upon the members 81 pivoted at 82 to a bracket, not shown, mounted on the aforesaid frame. The members 81 extend toward each other, leaving a gap of sufficient width between their ends to allow free entry of the needle 77 when the same is in the balanced, zero or mid-position, the needle 77 normally swinging freely between the edge 76 of member 75 and the lower edges of the members 81. The members 81 have the downwardly extending arms 83 drawn toward each other by the spring 84. Associated with the lower ends of arms 83 are the pins 85, 85, upon the triangular member 86 operatively secured to the member 65.

At each end of the arm or member 65 and insulated therefrom are carried the metal ears or projections 87 in electrical communication with the shoes 66, and which are adapted to be engaged by the cams 88, similar in shape and similarly positioned and secured upon the shaft 62. When shoes 66 engage the rim 67 of wheel 68, these ears 87, 87 are in electrical communication with each other and with the contact 89 through rim 67, with which the contact 89 continuously engages. Contacts 90, associated respectively with and in electrical communication continuously with the cams 88, may be individually associated through the contacting cams 88 with an ear 87 and, hence, with the contact 89 in a manner and for the purpose hereinafter described.

A conductor 91 connected to one terminal of the galvanometer coil 78 terminates in a contact 92 adjustable along the resistance R, and a second conductor 93 connected to the other terminal of coil 78 is conductively engaged with the resistance R1.

Contact 89 of the control apparatus is connected by a conductor 94 with one terminal of a source of electrical energy, herein shown as the conductor 17. One contact 90 is connected by a conductor 95 to the movable contact 96 of a limit switch whose fixed contact 97 is connected by a conductor 98 to a field coil 99 of a double field series motor 100. The other contact 90 is connected by a conductor 101 to the fixed contact 102 of a second limit switch whose movable contact 103 is connected by a conductor 104 to the other field coil 105 of motor 100.

Field coils 99 and 105 are connected by a conductor 106, from which branches a conductor 107 to one terminal of the armature of motor 100, whose other armature terminal is connected by a conductor 108 to the positive source of current supply herein shown as the conductor 16.

Operation of motor 100 effects rotative movement of shaft 109 carrying the worm 110 meshing with and driving the worm gear 111 carried by shaft 50.

A conductor 112 leads from that terminal of resistance R, to which conductor 15 is connected, to the terminal of resistance R1 to which the conductor 56 is connected.

The total voltage of the five series-connected magnetos M is applied across resistance R1 by the conductors 55 and 56. Since the voltage of each magneto M is proportional to the speed of its driving motor 41, the aforesaid total voltage is proportional to the average rate of delivery of fuel to the generator G. Preferably, and as indicated, only a portion of this total voltage is utilized for control purposes and, accordingly, conductor 93 leading from one terminal of the galvanometer coil 78 is connected to resistance R1 at a desired point between the ends thereof, as at 93a, the portion of said resistance herein designated as $r1$ between the terminal 112b of conductor 112 and terminal 93a of conductor 93 constituting the active part, the voltage across which is balanced against or opposed to the voltage across a portion of the control current shunt or resistance R herein designated as $r$ between the terminal 112a of conductor 112 and the adjustable contact 92 of conductor 91 leading to the other terminal of galvanometer coil 78.

The operation is as follows:

With the apparatus stabilized and for substantially constant load on generator G, the voltage across resistance $r$ will be the equal of but in opposition to the voltage across resistance $r1$. Under such condition there is no current flow through the galvanometer coil 78 and it is, therefore, in its zero or non-deflecting position illustrated, its pointer or needle 77 being then in the mid-position and is merely lifted periodically by the member 73 between the ends of the members 81, 81, and all the parts remain in normal position.

Suppose, however, that the load on generator G increases with consequent decrease of steam pressure effecting downward movement of diaphragm 7 to automatically increase the control current in circuit 15. As hereinbefore described, controller A, in response to the increased control current moves damper 4 further toward open position to increase the air flow to correspond with the new load.

Due also to the increased control current, the voltage drop across the control current shunt R and its active portion $r$ is increased in value, thereby disturbing the heretofore existing voltage balance between the same and the resistance $r1$. In such case, current will flow through the galvanometer coil 78, due to this inequality in voltages, and the needle 77 will be deflected, for example, toward the right, Fig. 1, and the extent of deflection will be the greater as the aforementioned inequality is the greater. The needle 77 being deflected to a position between the edge 76 of member 75 and the lower edge of the horizontal arm of the right-hand member 81, the cam 69, driven by the constantly rotating shaft 62, will first tilt the member 63 and lift the shoes 66 from the rim 67 of wheel 68, and immediately thereafter, and while the shoes 66 are still raised from rim 67, the cam 70 will raise the frame 73 and the attached member 75 and clamp the now deflected needle 77 between the edge 76 and the lower edge of the horizontal arm of right-hand member 81, causing said member 81 to rise and rotate about its pivot 82, causing the lower end of the right-hand arm 83 to force the right-hand pin 85 toward the left, thereby tilting the arm 65 in a clockwise direction, Fig. 1, through an angle whose extent is dependent upon or proportional to the extent of deflection of needle 77. After the cam 70 has released the frame 73, the cam 69 will allow the member 63 to return under the influence of a spring, not shown, to its normal position and bring the shoes 66 into engagement with the rim 67 of the wheel 68 in the angular position to which the arm 65 has been moved.

Thereafter, the left-hand cam 88 will engage the contact ear 87 on the arm 65 and rotate it and wheel 68 counterclockwise to position where arm 65 is again in normal position. Engagement of ear 87 by said cam 88 closes a circuit through the motor 100 with the series field winding 105 in circuit, the field winding 99 meanwhile being out of circuit. Thereupon, shaft 109 through the interposed gearing will rotate the shaft 50 in a clockwise direction, Fig. 1, to simultaneously increase the field circuit resistance of each of the various motors 41, whereupon the speed of such motors is increased, in turn increasing the rate of fuel delivery to generator G. This contact between cam 88 and ear 87 will continue until the arm 65 has been restored to normal or horizontal position and, accordingly, the duration of the contact and energization of motor 100 will depend upon the extent of the angle through which the arm 65 has to be moved to restore it to normal, and this angle is in turn dependent upon the extent of deflection of the needle 77, which in turn is dependent upon the extent of difference between the voltages across the resistances $r$ and $r1$. The return of the arm 65 to normal or horizontal position is accompanied by counterclockwise rotation of wheel 68, Fig. 1, through an angle equal to the angle through which the arm 65 was displaced by the arm or lever 83.

Increase of the speed of motor 100 as aforesaid causes an increase in the speed of magnetos M with consequent increase of voltage across the active resistance $r1$. Ordinarily, the above-described operation effected by a single rotation of shaft 62 is insufficient to restore the voltage balance between resistances $r$ and $r1$ and, consequently, there usually occur repetitions of such operations wherein needle 77 remains deflected toward the right, Fig. 1, with constantly decreasing amplitude until balance is restored. However, it may happen that a single operation of the control apparatus is sufficient to restore balance between said resistances $r$ and $r1$ or it may happen, due to a corrective adjustment, that the voltage across resistance $r1$ is increased to a value greater than the voltage across resistance $r$, in which case deflection of needle 77 toward the left, Fig. 1, would be effected to produce an operation the reverse of that described above and one in which series winding 99, and not winding 105, would be energized to effect counterclockwise rotation of shaft 50. Similarly, the rate of fuel feed is decreased when the steam pressure rises due to a decrease in steam demand.

Due to the provision of an adjustable contact, as the contact 92 coacting with resistance R it is possible to adjust to any desired value the voltage drop to be balanced against the voltage across resistance $r1$. In this manner, the speed of the fuel-feeding motors 41, when the control apparatus is balanced, may be selected and fixed at any desired value. Therefore, if, for example, the density or heat value of the fuel falls off, contact 92 may be moved in such direction as to increase the length of, and hence the voltage drop across the resistance $r$, the control apparatus then automatically increasing the speed of motors 41 to deliver additional amounts of the less dense fuel.

Inasmuch as the rotatable contact arm 47 of each rheostat 44 is adjustable circumferentially of shaft 50, the speed of one or more of motors 41 may be regulated independently of the automatic speed-control mechanism comprising the shaft 50 which regulates the speed of all of said motors 41 simultaneously. This independent speed adjustment of the individual motors is particularly desirable in order to compensate for variations in the rate of fuel delivery by the screws 34, some of which, for one reason or another, may in time deliver fuel more rapidly than others.

The conductive strips 54 forming arcuate continuations for each end of resistance elements 45 should be so positioned that the contact point mounted on an arm 47 may ride thereupon, if for any reason such arm is moved beyond either end of the resistance element.

It will also be observed that undue rotation of shaft 50 in a clockwise direction serves to open limit switch 102, 103 to deenergize winding 105, and that undue rotation of said shaft in a counterclockwise direction will effect opening of winding 99 through the limit switch 96, 97.

Figure 2:
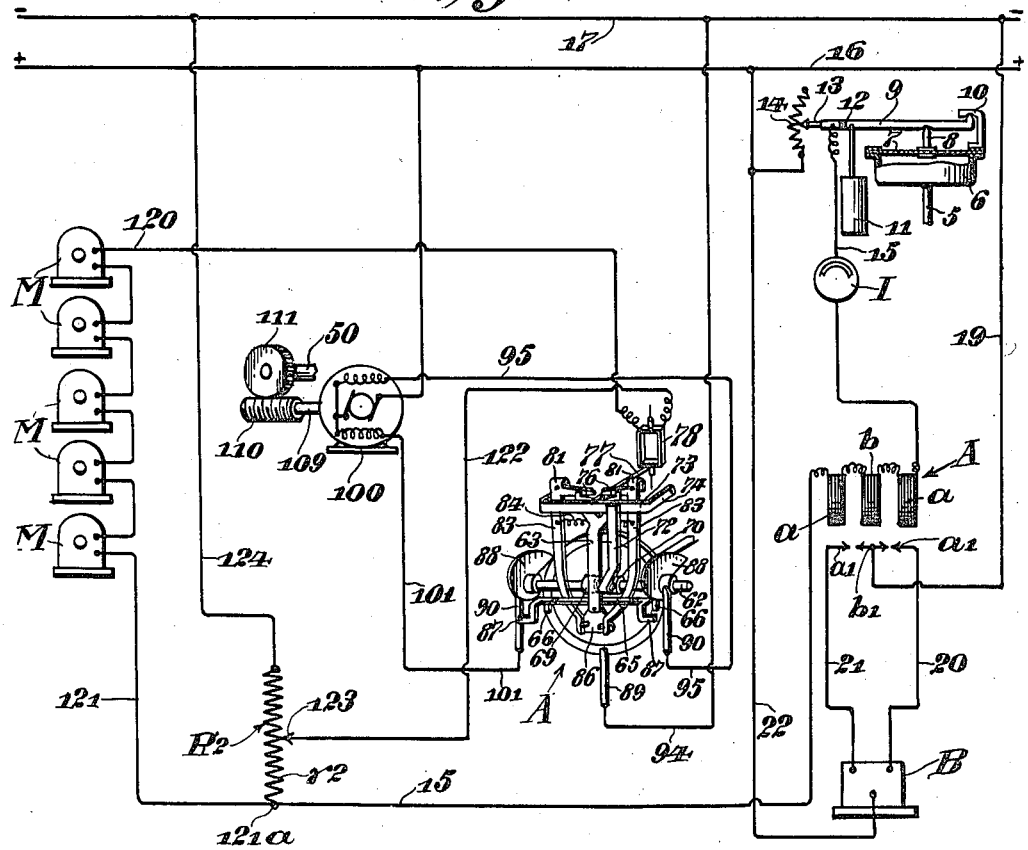
Fig. 2 is a diagrammatic view of another form of my invention.

In Fig. 2, there is diagrammatically illustrated an arrangement wherein the magnetos M mechanically connected to fuel-feeding motors, not shown, and driven at speeds proportional to the speeds of the respective motors, are connected in series to the conductors 120 and 121, the former being connected to one terminal of the galvanometer coil 78 from whose other terminal leads a conductor 122 terminating in a contact 123 adjustably coacting with a resistance R2 to one end of which is connected the conductor 121. Leading from the conductor 16 over which current flows from the positive source of supply and connected to the same end of resistance R2 as the conductor 121 is the conductor 15 traversed by the control current. To the other end of resistance R2 is connected a conductor 124 leading to the conductor 17 connecting with the negative terminal of the source of current.

The control balance A of Fig. 2 corresponds with and may be controlled in a manner similar with the corresponding balance of Fig. 1.

In accordance with the form of my invention illustrated in Fig. 2, the average of the different rates of fuel feed or average speed of the fuel-feeding devices is related to changes in load by balancing the total voltage due to the series-connected magnetos M against the voltage due to the passage of the control current through the active part of resistance R2, namely, the part $r2$ between the terminal $121a$ of conductor 121 and the contact 123 of conductor 122. Aside from the fact that the total electromotive force of the magnetos M is utilized as described above, the operation of this form of my invention is the same as described above with respect to Fig. 1.

Figure 3:
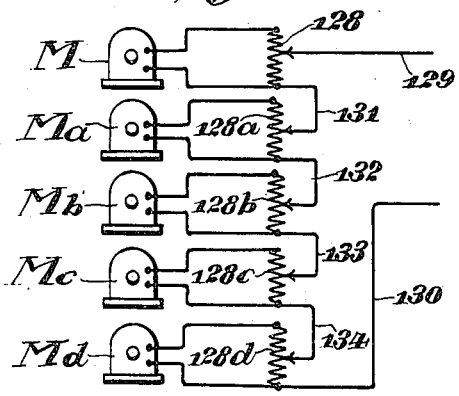
Fig. 3 is a diagrammatic view of still another modification.

In Fig. 3 is illustrated a compensating arrangement to care for variations in the characteristics of the individual fuel-feeding devices. To this end, there is provided suitable structure for varying the effective voltage developed by the individual magnetos M, Ma, Mb, Mc and Md, each of which, as described above, is driven by and at a speed proportional to the speed of its associated fuel-feeding motor. As herein shown, resistances 128, $128a$, $128b$, $128c$ and $128d$ are connected, respectively, across the terminals of the various magnetos M, Ma, Mb, Mc and Md. Adjustably coacting with resistance 128 is the terminal of a conductor 129 leading to one terminal of the control apparatus galvanometer coil, not shown, to whose other terminal is secured conductor 130 connected to one end of resistance $128d$. Connected to one end of resistance 128 is a conductor 131 adjustably coacting with $128a$, from one end of which branches a conductor 132 adjustably coacting with resistance $128b$. Another conductor 133 secured to the end of resistance $128b$ is adjustably mounted in conductive relation with respect to resistance $128c$ to one end of which is secured a conductor 134 adjustably coacting with resistance $128d$.

By the foregoing arrangement, due to the provision of a separate shunt for each magneto, its voltage as applied to the galvanometer circuit may be so adjusted as to correspond with the actual rate of fuel feed, thereby providing compensation for differences in the amounts of fuel fed by individual feeding devices caused, for example, by wearing of some feeding screws more rapidly than others.

In Fig. 5 there is illustrated a form of my invention wherein the shunt for maintaining a ratio between the average rate of fuel feed and the rate of air flow is automatically controlled in accordance with a varying condition indicative of the heat output for a given load. In the example shown, there is utilized a controller operating to maintain a predetermined ratio between boiler steam flow and control current, and hence there is provided a pipe or conduit P traversed by steam from the generator whose fuel-air ratio is to be controlled. The steam flows in the direction of the arrow, Fig. 5, through conduit P, which is provided with a partition or wall 140 forming a restricted orifice 141. Leading from conduit P on each side of wall 140 are the flexible pressure tubes or pipes 142 and 143, both of which pass interiorly of a member 144 and communicate, respectively, with the arms of a U-tube manometer 145 suitably secured to the member 144. Within the manometer 145 is a liquid seal 146 formed of a suitable fluid, as mercury, of greater density than the fluid in the pipes 142 and 143.

A conductive strip or contact 147 suitably secured to the manometer 146 is connected by a conductor 148 to the conductor 17 leading to the negative terminal of a source of electrical energy, not shown, from whose positive terminal branches the conductor 16 to which is connected a conductor 149 leading to the armature circuit of a reversible electric motor 150 comprising two field windings, not shown, respectively connected to the conductors 151 and 152 terminating, respectively, in the contacts 153 and 154 fixed on opposite sides of contact 147. A threaded shaft 155 rotated by the armature of motor 150 carries a nut 156 or the like having a contact 157 coacting with a resistance R5, which corresponds to resistance R in Fig. 1.

Member 144, pivotally mounted at 159, carries the movable coil $k$ of a Kelvin balance cooperating with the fixed coils $k1$ and $k2$ disposed adjacent and on either side of the coil $k$.

As shown, coils $k2$, $k$ and $k1$ are in series with the control circuit conductor 15 which leads from coil $k1$ to one end of resistance R5 whose other end is connected by a conductor 160 to the negative source of current supply by way of conductor 17.

For generating a voltage proportional to the average rate of fuel feed, or average speed of the fuel-feeding devices, the magnetos M are connected in series by the conductors 161 and 162 whose ends are connected, respectively, to the ends of a resistance R6 which corresponds to resistance R1 in Fig. 1. Branching from the same end of resistance R6 as conductor 162 is the conductor 163 connected to the same end of resistance R5 as is the control current conductor 15.

Resistance R6 is utilized when it is desired to employ but a part of the total voltage developed by the magnetos M for control purposes. The fraction of the total voltage thus utilized may be selected by connecting a conductor 164 to resistance R6 at a desired point between its ends, conductor 164 being extended to one terminal of the control apparatus galvanometer coil 78, whose other terminal is connected by a conductor 165 to contact 157.

For constant steam flow-control current ratio, the support 144 remains in a vertical position and the system functions as heretofore described in connection with Fig. 1, by balancing the magneto voltage, or a part thereof represented by the voltage across resistance section $r6$, against the voltage across the active resistance section $r5$ to maintain a predetermined ratio between the rates of air flow and fuel supply.

However, if the heat output for a given control current at the individual boiler decreases as caused, for example, by increase in moisture content of the fuel resulting in a reduction of the total amount of fuel fed for a given speed of the fuel-feeding screws, the steam flow-control current ratio at the particular boiler would be correspondingly decreased, resulting in counterclockwise movement of member 144, whereupon initiation of rotation of motor 150 would be effected and in such direction as to move the nut 156 downward. As a result, the control apparatus galvanometer would deflect in the direction producing an increase in the rate of fuel feed. The downward movement of nut 156 would continue until the steam flow-control current ratio had increased sufficiently to restore member 144 to its normal vertical position. For an increase of heat output for a given control current the operation would be the reverse of that described. It is normally preferable to operate nut 156 at a relatively slow speed as compared with the rate of movement of the rheostat shaft 50. This action results in automatic compensation for changes of fuel quality and the like, but prevents appreciable changes of the fuel-air ratio when the steam flow varies temporarily because of sudden load changes or uneven feed water supply.

While the foregoing description has been limited to a particular form of pulverized fuel-feeding apparatus, it shall be understood that any desired type of pulverized fuel-feeding device may be utilized. It shall also be understood that in accordance with my invention combustion may be effected by solid fuel other than that in pulverized form, or by liquid or other fuel, provided that the device feeding such fuel to the furnace comprises or actuates an element varying in speed with the rate of fuel delivery.

Although the foregoing description has been limited to a single generator or boiler for supplying steam to the header 2a, it shall be understood that other generators or boilers may be similarly utilized, in which case there would be provided systems of control similar to and connected in parallel with the system herein described, all actuated, however, in response to change in position of the single diaphragm 7.

It shall be understood that the control current or other factor may be changed in magnitude otherwise than by change in steam pressure, for example, by variation in steam flow or other condition indicative of load, steam temperature, furnace temperature, rate of air flow, temperature of the heated product, etc.

In Fig. 6 is shown the modification wherein the control current or other factor is changed in magnitude by variation in steam flow, the various parts and connections designated by the same reference characters designating corresponding parts and connections in Fig. 1. In this modification, the adjustable contact 13 of the master controller is actuated through suitable screw-and-nut-mechanism 170 by a reversible motor 6a connected across lines 16 and 17 for operation in either direction by engagement of the movable contact 171 with the associated fixed contacts 172 and 173. Contact 171 is carried by the lower end of the lever 174 pivotally mounted at 175 and which also carries the central movable coil 176 of the Kelvin balance coils shown connected in series in the control circuit. The upper end of lever 174 is pivotally connected to the bar 177 having its ends fixed to the respective diaphragms of opposing fluid-pressure motors 178 and 179 connected as shown to opposite sides of an orifice plate 180 in steam line 2. Upon variation in the rate of steam flow, the pressure differential across plate 180 will vary accordingly and lever 174 placed out of balance and tilted to cause engagement of contact 171 with contact 172 or contact 173, as the case may be, whereupon motor 6a operates in the proper sense to readjust contact 13 and vary the control current until the Kelvin coils are effective to effect a balance at the new differential pressure, at which time lever 174 again assumes its neutral position shown, and motor 6a is de-energized. It will, therefore, be seen that the control action is the same as that in Fig. 1 except that the control current is changed in magnitude by variation in the pressure differential across the orifice plate, which in turn is representative of variation in the rate of steam flow.

By connecting the upper end of lever 174 in Fig. 6 to a suitable Bourdon tube structure 181 and an associated pressure bulb thermometer 182 disposed in the steam line 2, as shown in Fig. 7, the control current is changed in accordance with variations in steam temperature. By placing the pressure bulb thermometer within the furnace G, as shown in Fig. 8, the control current is changed in accordance with variations in furnace temperature or temperature of the products being heated in the furnace.

In the modification shown in Fig. 9, the fluid-pressure motors 178 and 179 in Fig. 6 are replaced by a second set of Kelvin balance coils wherein the movable coil 183 is excited through a suitable transformer 184 in accordance with the voltage across the station bus lines 185 supplying the electrical load. The associated fixed coils are connected, as shown, in series with each other and supplied through the current transformer 186 with a current proportional to the line current. In this modification, therefore, the control current is changed in magnitude by variation in the total station electrical load.

In the modification shown in Fig. 10 the fluid-pressure motors 178 and 179 in Fig. 6 are replaced by the inverted bells or domes 186 and 187 having their lower end portions emerged in the liquid 188 in tank 189. Pipe lines 190 and 191 are connected respectively to different points 192 and 193 of the boiler G subjected to pressure conditions at different regions in the draft passage, the lines 190 and 191 extending upwardly through tank 189 and into the bells, as shown. In this modification, therefore, the control current is changed in magnitude by variation in the rate of air flow or draft through the boiler tubes. When the modification in Fig. 10 is employed in Fig. 1, the air flow control, provided by controller A and associated parts and connections, is omitted. The various means described may be omitted, and the contact arm of the master controller operated manually. Such an arrangement is shown in Fig. 11.

It shall also be understood that my invention may be practiced otherwise than as described for combustion control. For example, there may be maintained forces proportional, respectively, to the average rate of speed of a plurality of variable speed devices, and to some condition other than rate of combustion, etc., and which, as in Figs. 1 to 11, is dependent upon the operation of said devices, and these forces may be utilized jointly to establish a ratio between said average rate of speed and said condition.

A system embodying such method of operation is shown in Fig. 12. This is a hydraulic system, and comprises a pumping station supplying a distant distribution station. The pumping station comprises pumps 194 driven by the variable speed motors 195 and each operating to pump water from the reservoir 196 and discharge the same into the common conduit or feed line 197 supplying the tank or chamber 198 at the distant distribution station and from which the individual feed lines 199 lead. The motors 195 are each connected through adjustable speed control rheostat 200 to the station bus lines 201 supplied by a D. C. generator 202 whose generated voltage is controlled by the adjustable field rheostat 203. Each of the motors 195 drives a tachometer 204, as indicated, the tachometers connected in series with respect to each other, and such series connected across the terminals of the solenoid winding 205 by connections 206 and 207. Voltmeters 208 are connected across the commutators of the tachometers to provide an indication of the voltage or electromotive force developed thereby. The electromotive force impressed upon winding 205 acts upon the pivotally mounted lever 208, as indicated by the arrow 209, in opposition to a second electromotive force acting upon the lever as represented by the arrow 210. The second force is impressed upon the solenoid winding 211 connected in the local circuit shown, and which includes the adjustable resistance 14a at the distribution station. Resistance 14a is adjusted by the fluid-pressure motor 6b connected through pipe line 212 to chamber 198 and, therefore, responsive to variations in pressure conditions therein. When the forces represented by arrows 209 and 210 are out of balance in either sense, pivotal movement is imparted to lever 208 in a corresponding direction to effect engagement of contact 213 with one or the other of the fixed contacts 214, whereupon the motor 215 is caused to operate in the proper direction to adjust field rheostat 203, and, therefore, vary the average speed of the variable speed motors or devices 195. This variation in average speed of motors 195 is accompanied by a corresponding variation in the force 209 to rebalance lever 208 whereupon contact 213 returns to the neutral position shown to de-energize motor 215.

The lever 208 and associated parts operate to utilize the forces 209 and 210 jointly to control the average speed of the motors or devices 195, and by such control maintain a given relation between such average speed and the load demand on the distribution station. This relation may be varied by changing the position of a weight 218 on lever 208 or by adjusting a suitable resistance 219 in connection 217 at the distribution station.

The speed-control rheostats 200 provide for individual determination at the pumping station of the speed of one or more of the variable speed motors or devices 195. The series-connected tachometers 204 operate, through the agency of winding 205 connected thereto, to maintain a force, represented by arrow 209, proportional to the average rate of speed of the motors or devices 195. The winding 211 operates to develop a second force represented by the arrow 210, and which is varied through the agency of variable resistance 14a and the actuating fluid-pressure motor 6b therefor to accord with a condition dependent upon the operation of the devices or motors 195 which, in this case, is the condition of water pressure in chamber 198 at the distribution station.

The broken line 215 is for the purpose of indicating that the pumping and distributing stations may be at a relatively great distance from each other and connected only by the pipe line 197 and electrical connections 216 and 217.

From the foregoing it will be seen that my invention is of broad adaptability and can be embodied in systems for many different purposes and covering a broad field, and wherein the control action in each case is one calling for individual determination of the speed of one or more of a plurality of variable speed devices, the maintenance of a force proportional to the average rate of speed of the devices, the variation of a second force to accord with a condition dependent upon the operation of the devices, and the utilization of these forces jointly to control the average speed of the devices.

This application is a continuation in part of my application, Serial No. 116,776, filed June 18, 1926.

What I claim is:

1. In the art of speed control, the method which comprises individually determining the speed of one or more of a plurality of variable speed devices, maintaining a force proportional to the average rate of speed of said devices, varying a second force to accord with a condition dependent upon the operation of said devices, and utilizing said forces jointly to control the average speed of said devices.

2. In the art of speed control, the method which comprises individually determining the speed of one or more of a plurality of variable speed devices, maintaining a force proportional to the average rate of speed of said devices, varying a second force to accord with a condition dependent upon the speed of said devices, and utilizing said forces jointly to control the average speed of said devices.

3. In the art of speed control, the method which comprises individually determining the speed of one or more of a plurality of variable speed devices, developing an electromotive force proportional to the average rate of speed of said devices, developing a second electromotive force whose magnitude accords with a condition dependent upon the operation of said devices, and utilizing said electromotive forces jointly to control the average speed of said devices.

4. In the art of combustion control, the method which comprises supplying to a furnace by independently actuated fuel chargers a plurality of streams of fuel, individually determining the speed of one or more of said fuel chargers, maintaining a force proportional to the average rate of speed of the fuel feeding devices, varying a second force to accord with a condition of furnace operation, and utilizing said forces jointly to maintain a predetermined ratio between said average rate of speed and said condition.

5. In the art of combustion control, the method which comprises supplying to a furnace a plurality of streams of fuel, independently varying the rate of supply of said streams, maintaining a force proportional to the average rate at which fuel is supplied, varying a second force to accord with changes in load on the furnace, and utilizing said forces jointly to control the average rate at which fuel is supplied by said streams.

6. In the art of combustion control, the method which comprises supplying to a furnace a plurality of streams of fuel, independently varying the rate of supply of said streams, maintaining a force proportional to the average rate at which fuel is supplied, varying a second force to accord with changes in load on the furnace, opposing said forces, and utilizing the resultant force to control the average rate of supply of fuel to establish a desired ratio between said average rate at which fuel is supplied and the load on the furnace.

7. In the art of combustion control, the method which comprises supplying to a furnace a plurality of streams of fuel, independently varying the rate of supply of said streams, developing an electromotive force proportional to the average rate at which fuel is supplied, giving to an electric control current different predetermined magnitudes to accord with changes in the load on the furnace, and utilizing said control current and electromotive force jointly to control the supply of fuel thereby to establish a desired ratio between said average rate at which fuel is supplied and the load on the furnace.

8. In the art of combustion control, the method which comprises supplying to a furnace a plurality of streams of fuel, independently varying the speed of the fuel-feeding devices, maintaining a force proportional to the average rate of speed of the fuel-feeding devices, controlling the rate of delivery of air to said furnace by a force varying in magnitude to accord with a condition of furnace operation, and utilizing said forces jointly to establish a desired ratio between the rate of air supply and said average rate of speed.

9. In the art of combustion control, the method which comprises supplying to a furnace a plurality of streams of fuel at rates which may differ one from another, maintaining a force proportional to the average rate at which fuel is supplied, controlling the rate of delivery of air to said furnace by a force varying in magnitude to accord with changes in load on the furnace, selecting a ratio between the rate of air supply and said average rate at which fuel is supplied, and utilizing said force to maintain said ratio.

10. In the art of combustion control, the method which comprises supplying to a steam-generating system a plurality of streams of fuel, varying at will the speed of one or more fuel-feeding devices, maintaining a force proportional to the average rate of speed of the fuel-feeding devices, controlling the rate of delivery of air to said system by a force varying in magnitude to accord with changes in load on the system, opposing said forces, and utilizing the resultant force to establish a desired ratio between the rate of air supply and said average rate of speed.

11. In the art of combustion control, the method which comprises supplying to a steam-generating system a plurality of streams of fuel, independently varying the rate of supply of said streams, maintaining a force proportional to the average rate at which fuel is supplied, controlling the rate of delivery of air to said system by a force varying in magnitude to accord with changes in load on the system, and intermittently utilizing said forces jointly to establish a ratio between the rate of air supply and said average rate at which fuel is supplied.

12. In the art of combustion control, the method which comprises supplying a plurality of streams of fuel to a steam-generating system, independently varying the rate of supply of said streams, developing an electromotive force proportional to the average speed of the fuel-feeding devices, varying the magnitude of a second force to accord with changes in load on the system, and utilizing said electromotive force and said force jointly to maintain a ratio between said average rate of speed and the load on the system.

13. In the art of combustion control, the method which comprises supplying a plurality of streams of fuel to a steam-generating system, independently varying the rate of supply of said streams, developing an electromotive force proportional to the average rate at which fuel is supplied, giving to an electric control current different predetermined magnitudes to accord with changes in the load on the system, and utilizing said electromotive force and control current for maintaining a predetermined ratio between the load on the system and said average rate at which fuel is supplied.

14. In the art of combustion control, the method which comprises supplying to a furnace a plurality of streams of fuel, independently varying the rate of supply of said streams, developing an electromotive force proportional to the average rate at which fuel is supplied, developing a second electromotive force proportional to the load on the furnace, and utilizing said electromotive forces jointly to establish a desired ratio between the load on the furnace and said average rate at which fuel is supplied.

15. In the art of combustion control, the method which comprises supplying to a furnace a plurality of streams of fuel, maintaining a force proportional to the average rate of speed of the fuel-feeding devices, varying a second force to accord with a condition of furnace operation, selecting a ratio between said average rate of speed and said condition, utilizing said forces jointly to maintain said ratio, and changing said ratio by a force varying in magnitude to accord with changes in the ratio of heat output to said first-named force.

16. In the art of combustion control, the method which comprises supplying to a furnace a plurality of streams of fuel at rates which may differ one from another, maintaining a force proportional to the average rate at which fuel is supplied, giving to an electric control current different predetermined magnitudes to accord with changes in load on the furnace, selecting a ratio between said average rate at which fuel is supplied and the load on the furnace, utilizing said forces jointly to maintain said ratio, and changing said ratio by a force varying in magnitude to accord with changes in the ratio of heat output to control current.

17. In the art of combustion control, the method which comprises supplying to a furnace a plurality of streams of fuel at rates which may differ one from another, maintaining a force proportional to the average rate at which fuel is supplied, controlling the rate of delivery of air to said furnace by a force varying in magnitude to accord with changes in load on the furnace, utilizing said forces jointly to maintain a ratio between said average rate at which fuel is supplied and the rate of air supply, and changing said ratio by a force varying in magnitude to accord with changes in the ratio of furnace load to air flow.

18. In a combustion controlling system, a plurality of fuel-feeding devices, means for independently varying at will the rate at which fuel is fed by at least one of said devices, means for developing a factor proportional to the average rate of speed of said devices, means for developing a factor varying in magnitude to accord with changes in a condition of operation of the system, and means responsive to the conjoint action of said factors for establishing a desired ratio between said condition and the average rate of speed of said devices.

19. In a combustion controlling system, a plurality of devices feeding fuel at rates differing one from another, means for developing a factor proportional to the average rate at which fuel is fed by said devices, means for opposing said factor by a second factor varying in magnitude to accord with changes in load on the system, and means for utilizing the resultant factor for maintaining a predetermined ratio between the load and said average rate at which fuel is supplied.

20. In a combustion control system, means for developing a force varying in magnitude to accord with changes in load on the system, a plurality of fuel-feeding devices adapted to operate at speeds differing one from another, a plurality of serially-connected magnetos driven individually by each of said devices for developing an electromotive force proportional to the average rate of speed of said devices, and means responsive to the conjoint action of said force and electromotive force for establishing a desired ratio between the load and said average rate of speed.

21. In a combustion control system, means for developing a force varying in magnitude to accord with changes in load on the system, and means for opposing said force by an electromotive force proportional to the average rate at which fuel is supplied to said system comprising a plurality of fuel-feeding devices, a plurality of serially-connected magnetos individually driven by each of said devices for generating said electromotive force, and means responsive to the conjoint action of said force and electromotive force for varying the speeds of said devices.

22. The combination with a combustion-controlling system comprising a plurality of fuel-feeding devices adapted to operate at different speeds, means for developing an electromotive force proportional to the average rate of speed of said devices, and means for opposing said electromotive force by a force proportional to a fluid condition of the system, of a member movable in response to departure of said force and electromotive force from a predetermined ratio and periodically operated means controlled by said movable member for restoring said predetermined ratio.

23. The combination with a combustion-controlling system comprising a plurality of fuel-feeding devices adapted to operate at different speeds, means for developing an electromotive force proportional to the average rate of speed of said devices, and means for opposing said electromotive force by a force proportional to the load on the system, of a member movable in response to departure of said force and electromotive forces from a predetermined ratio, and periodically operated means controlled by said movable member to a degree dependent upon the extent of its movement for restoring said predetermined ratio.

24. In a combustion-controlling system, a plurality of fuel-feeding devices, means for independently varying the rate of speed of at least one of said devices, means for developing a factor proportional to the average rate of speed of said devices, means for developing a factor varying in magnitude to accord with changes in a condition for operation of the system, means responsive to the conjoint action of said factors for establishing a desired ratio between said condition and the average rate of speed of said devices, and means for adjusting said ratio.

25. The combination with a combustion-controlling system comprising a plurality of fuel-feeding devices adapted to operate at different selected speeds, means for developing an electromotive force proportional to the average rate of speed of said devices, means for opposing said electromotive force by a force proportional to a condition of the system, of a member movable in response to departure of said force and electromotive force from a predetermined ratio, periodically operated means controlled by said movable member for restoring said predetermined ratio, and means for adjusting said ratio.

26. In a combustion-controlling system, a plurality of fuel-feeding devices, means for independently varying the rate of speed of at least one of said devices, means for developing a factor proportional to the average rate of speed of said devices, means for developing a factor varying in magnitude to accord with changes in a condition of operation of the system, means responsive to the conjoint action of said factors for establishing a ratio between said condition and the average rate of speed of said devices, and means for manually adjusting said ratio.

27. In a system having a plurality of variable speed devices, individual electric tachometers connected to each device and in series with each other, whereby the individual speeds of said tachometers are summated, said summation being proportional to the average speed of the devices, and means responsive to the joint effect of the series-connected tachometers for controlling said system.

28. In the art of combustion-control, the method which comprises supplying to a furnace a plurality of streams of fuel, individually determining the rate of fuel supplied by one or more of said streams, maintaining a force proportional to the average rate of total fuel supplied, varying a second force to accord with a boiler condition, and utilizing such forces jointly to maintain a predetermined ratio between said average rate of fuel supply and said condition.

29. In a speed-control system, a plurality of variable speed devices, means for individually determining the speed of certain of said devices, means maintaining a force proportional to the average rate of speed of said devices, means providing for a second force and operating to vary the same in accordance with variations in a condition in said system dependent upon the operation of said devices, and means responsive to the joint influence of said forces and operating in accordance therewith to control the average speed of said devices.

30. In a speed-control system, a plurality of variable speed devices, means for individually determining the speed of certain of said devices, means maintaining a force proportional to the average rate of speed of said devices, means providing for a second force and operating to vary the same in accordance with variations in a condition in said system dependent upon the speed of said devices, and means responsive to the joint influence of said forces and operating in accordance therewith to control the average speed of said devices.

31. In a speed-control system, a plurality of variable speed devices, means for individually determining the speed of certain of said devices, means developing an electromotive force proportional to the average rate of speed of said devices, means developing a second electromotive force and operating to vary the magnitude thereof in accordance with variations in a condition in said system dependent upon the operation of said devices, and means responsive to the joint influence of said electromotive forces and operating in accordance therewith to control the average speed of said devices.

32. An apparatus for the regulation of combustion in furnaces comprising in combination a plurality of burners; a plurality of feed devices supplying the fuel to said burners; a plurality of means each controlled by one of the feed devices in accordance with the quantities of fuel supplied by them and producing a regulating effect; and regulating means for the combustion controlled by the total effect produced by said first mentioned means.

33. An apparatus for the regulation of combustion in a furnace comprising a plurality of fuel delivering units, a plurality of means, each producing a regulating effect in accordance with the rate of supply of fuel by one of said units, and combustion regulating means controlled by the total effect produced by said plurality of means.

34. An apparatus for the regulation of combustion in a furnace comprising a plurality of fuel delivering units, a plurality of means, each producing a regulating effect in accordance with the rate of supply of fuel by one of said units, means for controlling the rate of delivery of air, combustion regulating means controlled by the total effect produced by said plurality of means to maintain a desired ratio of air to total fuel delivered by said units, and means for varying fuel-air ratio to compensate for variations in heat output from a predetermined standard.

35. An apparatus for the regulation of combustion in a furnace comprising a plurality of fuel delivering units, a plurality of means, each producing a regulating effect in accordance with the rate of supply of fuel by one of said units, means for controlling the rate of delivery of air, combustion regulating means controlled by the total effect produced by said plurality of means to maintain a desired ratio of air to total fuel delivered by said units, and means for varying the fuel-air ratio to maintain a predetermined combustion efficiency.

EDWARD S. BRISTOL.